UNITED STATES PATENT OFFICE 2,491,695

METHANOL OXIDATION CATALYSTS

Alvin B. Stiles, Charleston, W. Va., assignor to E. I. du Pont de Nemours & Company, Wilmington, Del., a corporation of Delaware No Drawing. Application June 25, 1946, Serial No. 679,264

6 Claims. (Cl. 260—603)

The invention relates to the manufacture of formaldehyde by the catalytic oxidation of methanol in which bismuth molybdate is used as a catalyst and also relates to a process of preparing bismuth molybdate catalysts.

An object of the present invention is to provide improved catalysts for the oxidation of methanol to formaldehyde. Another object is to provide suitable methods for preparing such a catalyst. A further object is to provide bismuth molybdate catalysts for the vapor phase oxidation of methanol in the presence of oxygen or air which catalysts may or may not be promoted. Yet another object is to provide bismuth molybdate catalysts promoted with sulfate ($SO_4^=$) and phosphate ($PO_4^\equiv$) radicals. Other objects and advantages of the invention will hereinafter appear.

The invention is conducted in accord with its broadest aspects by passing vaporized methanol in the presence of an oxidizing gas containing oxygen, air, or air diluted with an inert gas, into contact, under carefully controlled and well-known conditions, with catalysts of bismuth molybdate promoted or not with sulfate or phosphate radicals. These catalysts have been found to be particularly well adapted for catalyzing this oxidation reaction, giving excellent yields of formaldehyde with little or no methanol leakage and remarkably low by-product formation.

Any suitable method may be used for preparing the catalysts. For example bismuth molybdate may be formed by kneading bismuth nitrate with a salt of molybdic acid such as the ammonium salt, and thereafter drying and igniting the resulting slurry at a temperature between 300 and 500° C. The promoters can be introduced before or after ignition as the acid, such as sulfuric, or phosphoric acid or as an ammonium salt of the acid. The addition of the promoters is believed to result in an exchange of phosphate or sulfate for molybdate radicals attached to the metal. If the addition is made after ignition the resulting mixture is dried before use.

The examples illustrate preferred catalysts in which parts are by weight unless otherwise stated.

*Example A.*—A catalyst containing atomic ratios of bismuth to molybdenum and sulfur of 1:5:0.03 may be prepared by kneading bismuth nitrate (hydrated), ammonium molybdate and about 6% water in proper stoichiometrical proportions to give this ratio. The resulting slurry is ignited to 450° C., kneaded with 49 parts of 1° Baumé sulfuric acid per part of the ignited product and dried at 150° C. The catalyst has a density of 1.5.

*Example B.*—A catalyst having an atomic ratio of bismuth to molybdenum of 0.5 may be prepared by kneading the proper stoichiometric proportions of bismuth nitrate and ammonium molybdate in 5% of water and igniting to 450° C. This catalyst has a density of 1.2.

*Example C.*—A catalyst having an atomic ratio of bismuth to molybdenum to sulfur of 1:2:0.06 may be prepared by kneading 100 parts of product of Example B in 42 parts of 2% aqueous sulfuric acid and subsequently drying at 150° C. The catalyst has a density of 1.4.

*Example D.*—A catalyst having an atomic ratio of bismuth to molybdenum of 1:1.5 may be prepared by dissolving ammonium molybdate in water at 90° C., and adding the proper stoichiometrical amount of bismuth nitrate dissolved in an 18% nitric acid solution, while heating and stirring. The resulting product is filtered, washed with water and ignited at about 450° C. to give a catalyst having a density of 0.49.

*Example E.*—A catalyst having an atomic ratio of bismuth to molybdenum to sulfur of 1:1.5:0.03 is prepared by kneading the product of Example D with .066 part of sulfuric acid and 0.3 part of water per part of that product. This catalyst has a density of 1.09.

These catalysts were used in a process wherein methanol was oxidized to formaldehyde using a gas ratio of oxidizing gas to methanol of 10 to 1 on a weight basis.

*Catalyst tests*

| Catalyst No. | Atomic Ratio | Furnace T | Inlet T | Hot Spot | Conversion | | |
|---|---|---|---|---|---|---|---|
| | | | | | HCHO | $CO_2$ | HCOOH |
| | | °C. | °C. | °C. | Per cent | Per cent | |
| A | 1Bi-5Mo-.03S | 312 | 338 | 440 | 82 | 3 | |
| B | 1Bi-2Mo | 310 | 302 | 455 | 88 | 5 | .14 |
| C | 1Bi-2Mo-.06S | 299 | 278 | 455 | 90 | 6 | .04 |
| D | 1Bi-1.5Mo | 265 | 261 | 463 | 84 | 7 | |
| E | 1Bi-1.5Mo-.03S | 295 | 323 | 465 | 86 | 8 | .04 |

While the above examples illustrate operation with 8.5% oxygen in nitrogen as the oxidizing gas, the catalysts of this invention may likewise be used with inlet gas containing 10.9% oxygen or less. Moreover, the gas to methanol ratio may range from 6 to 1 on a molar basis up to, for example 30 to 1. If air is used as the oxidizing gas, the ratios may range from 14 to 1 up to 30 to 1. Space velocities may vary over a wide range and are preferably held between 200 and 50,000 hr.$^{-1}$ based on methanol. Temperatures within the cataylst bed may range between 200 and 550° C. and are preferably held between 250 and 450° C.

The catalysts are usually heated prior to use in order to facilitate handling and to eliminate fluctuations in composition which may result during the initial stages of a reaction if the catalyst is not so heated. Moreover, the heating step facilitates forming the catalyst into the particular mesh size most suitable for the particular converter employed. Accordingly, the catalyst may be heated during preparation to a temperature between 200 and 600 and preferably to a temperature slightly above that at which it is to be used. It may then be crushed or screened to size or pelleted in a suitable pelleting machine.

In use, the catalyst is disposed in a suitable reaction converter provided with adequate means for removing the heat of reaction, a mixture of methanol and air or other oxygen-containing gas being passed over the catalyst and the reaction conducted at ranges given above. Operation is generally at atmospheric pressure although elevated or reduced pressure may be employed. Of the catalysts of the type described, conversion of methanol is practically complete at optimum temperature levels and the product is primarily formaldehyde with small amounts of carbon monoxide as the principal by-product. At lower temperatures some methanol may pass through the catalyst unchanged. In either case the formaldehyde is separated by usual methods and if methanol is present, it is recovered and recycled.

The conditions for the oxidation of methanol to formaldehyde are all shown in the art, and it has been found that the catalysts of this invention will catalyze the reaction with excellent results, when working under conditions of time, temperature, concentration of vaporized alcohol in the mixture undergoing reaction at any suitable ratio of alcohol to oxygen, which conditions are already known in the art of catalytic oxidation of methanol to formaldehyde.

I claim:

1. In a process for the preparation of formaldehyde by the catalytic oxidation of methanol, the step which comprises passing vaporized methanol and an oxidizing gas containing oxygen into contact with a bismuth molybdate catalyst at a temperature between 200 and 500° C.

2. In a process for the preparation of formaldehyde by the catalytic oxidation of methanol, the step which comprises passing vaporized methanol and an oxidizing gas containing oxygen into contact with a bismuth molybdate catalyst at a temperature between 250 and 450° C.

3. In a process for the production of formaldehyde by the catalytic oxidation of methanol, the step which comprises passing vaporized methanol and an oxidizing gas containing oxygen into contact with a promoted bismuth molybdate catalyst at a temperature between 200 and 500° C.

4. In a process for the production of formaldehyde by the catalytic oxidation of methanol, the step which comprises passing at a temperature between 250 and 450° C. vaporized methanol and an oxidizing gas containing oxygen into contact with a bismuth molybdate catalyst promoted with a radical selected from the group consisting of sulfate ($SO_4^=$) and phosphate ($PO_4^=$) radicals.

5. In a process for the production of formaldehyde by the catalytic oxidation of methanol, the step which comprises passing at a temperature between 250 and 450° C. vaporized methanol and an oxidizing gas containing oxygen into contact with a catalyst of bismuth molybdate containing from 1.5 to 5 atoms of molybdenum per atom of bismuth.

6. In a process for the production of formaldehyde by the catalytic oxidation of methanol, the step which comprises passing at a temperature between 250 and 450° C. vaporized methanol and an oxidizing gas containing oxygen into contact with a bismuth molybdate catalyst containing 2 atoms of molybdenum and 0.06 atom of sulfur per atom of bismuth.

ALVIN B. STILES.

REFERENCES CITED

The following references are of record in the file of this patent:

UNITED STATES PATENTS

| Number | Name | Date |
|---|---|---|
| 1,383,059 | Bailey et al. | June 28, 1921 |
| 1,636,952 | Craver | July 26, 1927 |
| 1,722,297 | Jaeger | July 30, 1929 |
| 1,851,754 | Craver | Mar. 29, 1932 |
| 1,913,404 | Meharg | June 13, 1933 |
| 2,178,761 | Lazier | Nov. 7, 1939 |
| 2,320,253 | Arnold | May 25, 1943 |